(12) United States Patent
Krstic et al.

(10) Patent No.: US 10,735,396 B2
(45) Date of Patent: *Aug. 4, 2020

(54) SELECTIVELY SPECIFYING ACCOUNT ACCESS RECOVERY PROCESS BASED ON ACCOUNT ACTIVITY

(71) Applicant: Apple Inc., Cupertino, CA (US)

(72) Inventors: Ivan Krstic, San Francisco, CA (US);
James Wilson, San Jose, CA (US);
Eric Daniel Friedman, Berkeley, CA (US); Selvarajan Subramaniam, Cupertino, CA (US); Patrice O. Gautier, San Francisco, CA (US); John Patrick Gates, San Francisco, CA (US); Ramarathnam Santhanagopal, Sunnyvale, CA (US); Prabhakaran Vaidyanathaswami, San Jose, CA (US); Sudhakar Mambakkam, San Jose, CA (US); Raghunandan Pai, Cupertino, CA (US); Karthik Narayanan, London (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,472

(22) Filed: Oct. 22, 2018

(65) Prior Publication Data

US 2019/0158478 A1    May 23, 2019

Related U.S. Application Data

(63) Continuation of application No. 15/230,446, filed on Aug. 7, 2016, now Pat. No. 10,110,583, which is a
(Continued)

(51) Int. Cl.
*G06F 21/00* (2013.01)
*H04L 29/06* (2006.01)
*G06F 21/31* (2013.01)

(52) U.S. Cl.
CPC .............. *H04L 63/08* (2013.01); *G06F 21/31* (2013.01); *H04L 63/105* (2013.01); *H04L 63/12* (2013.01); *G06F 2221/2131* (2013.01)

(58) Field of Classification Search
None
See application file for complete search history.

(56) References Cited

U.S. PATENT DOCUMENTS 6,747,598 B2 *  6/2004  Bajikar ................... G06F 21/30
                                                    342/357.51
8,296,570 B2 * 10/2012  Hamid .................... G06F 21/31
                                                       713/165

(Continued)

*Primary Examiner* — Shin-Hon (Eric) Chen
(74) *Attorney, Agent, or Firm* — Morgan, Lewis & Bockius LLP (57) ABSTRACT

Some embodiments provide an account-access recovery method that receives a request to recover access to an account. The method also assesses recent usage of a device that is associated with the account. The method also, based on the assessment, selects a recovery process from a group of different recovery processes for regaining access to the account. The method also provides the selected recovery process to a party that is requesting the access recovery.

22 Claims, 7 Drawing Sheets

Related U.S. Application Data continuation of application No. 14/872,038, filed on Sep. 30, 2015, now abandoned.

(60) Provisional application No. 62/172,205, filed on Jun. 7, 2015.

(56) References Cited

U.S. PATENT DOCUMENTS

| | | | | |
|---|---|---|---|---|
| 8,850,524 B2* | 9/2014 | Morris | | G06F 21/31 |
| | | | | 709/203 |
| 8,856,879 B2* | 10/2014 | Schechter | | G06F 21/31 |
| | | | | 726/4 |
| 9,398,143 B1* | 7/2016 | Fullmer | | H04M 1/72577 |
| 9,497,312 B1* | 11/2016 | Johansson | | H04M 1/72577 |
| 9,854,432 B2* | 12/2017 | Racha | | H04W 4/046 |
| 2007/0300052 A1* | 12/2007 | Jevans | | G06F 21/34 |
| | | | | 713/1 |
| 2010/0100945 A1* | 4/2010 | Ozzie | | G06F 21/35 |
| | | | | 726/5 |
| 2010/0205425 A1* | 8/2010 | Takacs | | G06F 21/32 |
| | | | | 713/100 |
| 2011/0021176 A1* | 1/2011 | Nakamura | | H04M 1/673 |
| | | | | 455/411 |
| 2011/0154434 A1* | 6/2011 | Hernacki | | G06F 21/31 |
| | | | | 726/1 |
| 2012/0166533 A1* | 6/2012 | Rubinstein | | G06Q 30/0224 |
| | | | | 709/204 |
| 2012/0166553 A1* | 6/2012 | Rubinstein | | G06Q 50/01 |
| | | | | 709/206 |
| 2013/0343534 A1* | 12/2013 | Nguyen | | H04M 3/5191 |
| | | | | 379/265.09 |
| 2015/0135080 A1* | 5/2015 | Ji | | G06F 3/0416 |
| | | | | 715/728 |
| 2017/0142080 A1* | 5/2017 | Hill | | H04L 63/06 |

* cited by examiner

SELECTIVELY SPECIFYING ACCOUNT ACCESS RECOVERY PROCESS BASED ON ACCOUNT ACTIVITY

CROSS-REFERENCE TO RELATED APPLICATIONS

The present application is a continuation of U.S. application Ser. No. 15/230,446, filed Aug. 7, 2016, entitled "Selectively Specifying Account Access Recovery Process Based On Account Activity," which is a continuation of U.S. patent application Ser. No. 14/872,038, filed Sep. 30, 2015, which claims the benefit of U.S. Provisional Patent Application No. 62/172,205, filed Jun. 7, 2015; the disclosure of each of which is hereby incorporated herein in its entirety.

BACKGROUND

Today, most users of computing devices have multiple accounts that require the user to provide one or more credentials to gain access to them. Because of this, it is quite common for one person to have multiple passwords for multiple different accounts. With the increasing number of passwords, users typically forget the passwords that they use for their different accounts. Also, with the proliferation of devices that can be associated with one account, a user often has to supply passwords on multiple devices associated with an account whenever the user change his account password. Most password recovery schemes today offer one password recovery procedure to different users in different situations. Such static schemes do not properly address the differing circumstances of the different users of an account management system.

SUMMARY

Some embodiments of the invention provide a novel account-access recovery (AAR) method that selectively specifies an account recovery process based on detected account activity. In some embodiments, this method is implemented by a set of one or more servers that manages one or more accounts. Also, for the account, one or more servers in some embodiments provide one or more services, such as data-storage services, data-access services, email services, data synchronization services, etc.

From a requesting party, the method receives an account access recovery request. In some embodiments, this request is a request to reset a set of one or more credentials for signing into an account. The method then assesses how recently the account has been used, and based on this assessment, selects one recovery process from a group of different recovery processes for resetting the account credentials. The method then provides the selected recovery process to the requesting party, which may be a person, an entity, a device, a client application, etc. To reset the account credentials, the steps of the recovery process have to be performed satisfactorily (e.g., by the requesting party).

Different recovery processes include different sets of steps for resetting the account credentials. For an account that has been recently used, the method of some embodiments provides a recovery process that includes a more onerous set of steps than another recovery process that the method provides for another request for an account that has not been recently used. In some embodiments, two sets of steps of two different recovery processes can include different questions that need to be answered by the requesting party. Also, in some embodiments, two different sets of steps of two different recovery processes might require the requesting party to perform two different operations (e.g., one recovery process might require the requesting party to send an email, or provide an acknowledgement, from a third party email account associated with the account at issue, while another recovery process might only require the requesting party to answer questions).

In some embodiments, the method assesses the account-usage history (i.e., how recently the account has been used) as a metric to quantify the veracity of the AAR request. This is because in some embodiments, one or more services that are provided by the account cannot be used without having the account credentials. Hence, a first AAR request that is received while the account is being actively used or has recently been actively used, should be treated with more skepticism than a second AAR request that is received for an account that has not been used recently. The first AAR request should thus be subjected to a tougher AAR process than the second AAR request.

In some embodiments, the method computes an activity metric to express how recently the account has been used, and then uses this activity metric to select a recovery process from the group of different recovery processes. In some embodiments, the activity metric just relies or is biased towards relying on active uses of the account services, as opposed to passive use of these services. For instance, in some embodiments, some account services (such as sending emails, purchasing items, etc.) require a user to actively interact with the account services, while other account services (such as receiving emails, downloading data for background services on a device, etc.) do not require a user to actively interact with the account services. Accordingly, some embodiments compute the activity metric to factor only, or to be biased towards, usage of account services that require active participation of a user.

The access recovery method of some embodiments selects a recovery process from a group of different recovery processes based on reported recent usage of a device associated with the account. Specifically, after receiving a request to reset a set of credentials for signing into an account, the method (1) examines recent uses of the device, (2) based on this examination, selects one recovery process from the group of different recovery processes, and (3) provides the selected recovery process to the requesting party. In some embodiments, device usage is assessed in terms of device lock and/or unlock event data that the device reports for a recent time period to the set of servers that implement the recovery method. Conjunctively, or alternatively, some embodiments assess device usage by analyzing other reported operations on the device and/or network-based operations performed by the device.

In some embodiments, a device that is associated with an account has an account recovery parameter (called ARP below) that allows a user to reset a set of credentials for an account without entering the credential set completely. For instance, some embodiments allow the device to use the ARP to reset an account password if the user first provides a device access control parameter (e.g., the device unlock passcode, unlock gesture, etc.) that is needed to unlock the device. The provided access control parameter has to be authenticated (e.g., by the device) before allowing the device to use the ARP to reset the account password.

Accordingly, some embodiments assess the usage of the account-associated device to quantify the veracity of an AAR request that aims to reset the account credential set without using the device. Such a request makes sense if the device is not readily available (e.g., is lost, misplaced, or placed at a distant location), because if the device is available, a user can more easily change the account credential set by using the device. When the requesting party claims that the device is not readily available, then the device should not be currently in use or should be less likely to have been recently used.

Other embodiments assess usage of an account-associated device even when the device does not have ARP. Also, the recovery method of some embodiments combines both the device-usage and account-usage assessment approaches by examining a device's use of services that are associated with the account for which the AAR request has been received. For example, in some embodiments, the method computes an activity metric as described above, but now this metric expresses the device's recent use of services associated with the account (as opposed to more generally assessing the use of these services by any device). As mentioned above, the activity metric just relies on, or can be biased towards, uses of services that require active user participation.

In some embodiments, the recovery method includes a time delay in one or more AAR processes. For instance, after examining reported uses of the account and/or an account-associated device, the method may determine that the account and/or device have not been used recently. However, to ensure that this is not just an aberration, the method does not provide the requested credentials for a time period. During this time period, the method iteratively monitors the usage of the account and/or device to ensure that the account and/or device do not become active after a period of inactivity. When the device and/or account becomes active during the time period, the method rejects the AAR request or provides a more onerous AAR process to provide the requested credentials.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel account-access recovery (AAR) method that selectively specifies an account recovery process based on detected account activity. The method assesses the recent usage of the account, and based on this assessment, selects one recovery process from a group of different recovery processes for regaining access to the account. The method then provides the selected recovery process to a party that is requesting the account access recovery.

Figure 1:
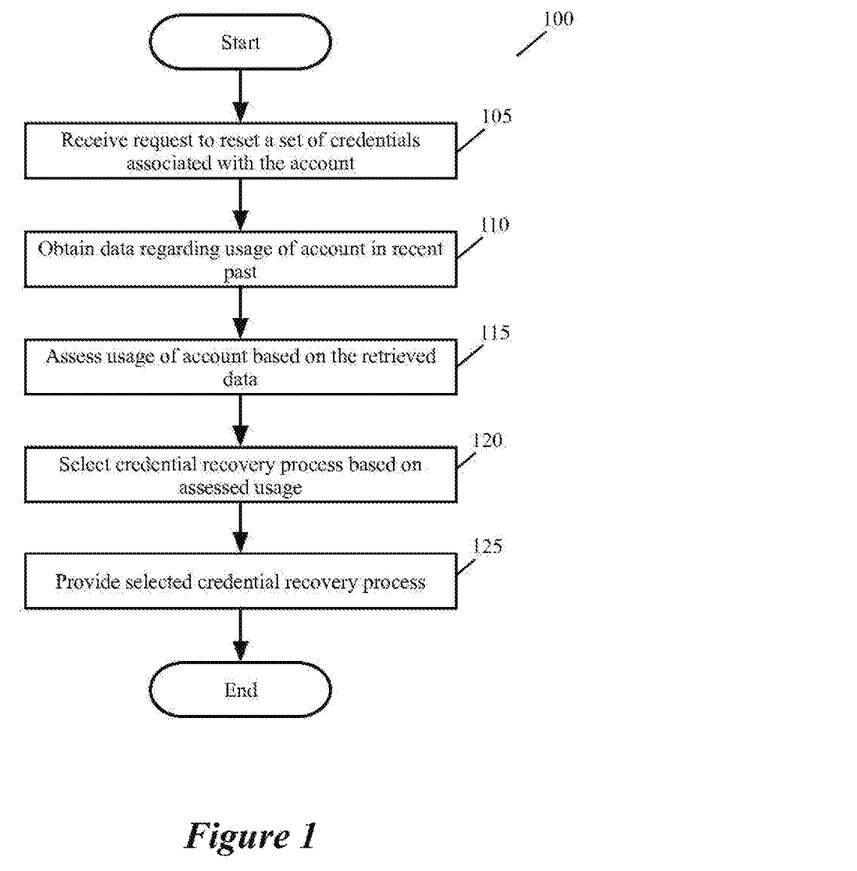
FIG. 1 conceptually illustrates an account-access recovery (AAR) process of some embodiments.

FIG. 1 conceptually illustrates an example of this AAA method 100. In some embodiments, this method is implemented by a set of one or more servers that manages one or more accounts, through which devices can access one or more servers that provide one or more services, such as data-storage services, data-access services, email services, data synchronization services, etc. As further described below, the server set computes an activity metric to express how recently the account has been used, and then uses this activity metric to select a recovery process from the group of different recovery processes.

In the example illustrated in FIG. 1, the AAR request is a request to reset a set of one or more credentials for accessing an account. Hence, from a requesting party, the server set initially receives (at 105) a request to reset the set of one or more credentials. The credential set is different in different embodiments. In some embodiments, the requested credential set includes a password and/or username (e.g., a name, a handle, an email, etc.). The requesting party is a person (e.g., is the owner or administrator of the account) in some embodiments. In these or other embodiments, the requesting party can also be an entity, a device, a client application, etc.

Next, at 110, the server set obtains data regarding recent usage of the account (e.g., account usage in the past day, few days, week, etc.). In some embodiments, the server set obtains this information by accessing one or more data storages of the server set, and/or one or more data storages accessible by the server set. From the obtained data, the server set then assesses (at 115) the activity of the account (i.e., assesses how recently the account has been used).

In some embodiments, the server set assesses (at 115) the account activity in order to quantify the veracity of the AAR request. This is because, in some embodiments, one or more services that are provided for the account cannot be used without having the account credentials, or a key or token that was obtained by using the account credentials. Hence, a first AAR request that is received while the account is being actively used or has recently been actively used, should be treated with more skepticism than a second AAR request that is received for an account that has not been used recently. The first AAR request should thus be subjected to a tougher AAR process than the second AAR request.

In some embodiments, the server set computes (at 115) an activity metric to quantify the recent usage of the account (e.g., the usage of the account in the last day, few days, week, etc.). Some embodiments compute the activity metric from the account usage history data. In some embodiments, the activity metric just relies, or is biased towards relying, on active uses of the account services, as opposed to passive use of these services. For instance, in some embodiments, some account services (such as sending emails, purchasing items, etc.) require a user to actively interact with the account services, while other account services (such as receiving emails, downloading data for background services on a device, etc.) do not require a user to actively interact with the account services. Accordingly, some embodiments compute the activity metric to factor only, or to be biased towards, usage of account services that require active participation of a user.

The server set then uses (at 120) the assessed activity (e.g., the activity metric) to select a recovery process from a group of different recovery processes. Each recovery process provides a set of steps for the requesting party to perform before the party is allowed to reset the requested credential set. Different recovery processes include different sets of steps for resetting the account credentials. For an account that has been recently used, the server set in some embodiments provides a recovery process with a more onerous set of reset steps than another recovery process that the server set provides for another AAR request that is for another account that has not been recently used.

In some embodiments, two sets of steps of two different recovery processes can include different questions that need to be answered by the requesting party. For instance, a more onerous recovery process in some embodiments includes tougher questions (e.g., questions that are more difficult to answer as they less common or have less commonly known answers), while a less onerous recovery process in some embodiments includes easier questions (e.g., questions that are more easier to answer as they are typical account recovery questions).

In some embodiments, two different sets of steps of two different recovery processes can require the requesting party to perform two different operations. For instance, one recovery process can require the requesting party to send an email, or provide an acknowledgement, from a third party email account associated with the account at issue, while another recovery process can only require the requesting party to answer questions. Other examples of the reset operations (i.e., reset steps) include going to a store or another location with appropriate personal identifier, responding to a text message sent to a phone number associated with the file, providing the security code from a credit card, providing the passcode of a device, or providing any other second factor authentication parameter (e.g., providing code texted to a trusted phone number).

A first recovery process is more onerous than a second recovery process when the first recovery process has more operations or has more onerous operations. In some embodiments, the recovery method is designed such that answering questions (such as birth date, name of first pet, name of first school, mother's maiden name, etc.) is viewed as being less onerous than checking electronic messages (such as emails, text messages, etc.), which is viewed as being less onerous than going to a store with the appropriate personal identifier.

Also, based on assessed account usage activity, the process 100 in some embodiments (at 125) might reject an account recovery request outright, or might provide the most onerous recovery process, which in some cases would require the user to show up to a location (e.g., a store) and provide identification documents to verify the identity.

To select different recovery processes for different computed activity values, the server set in some embodiments uses a look-up table (LUT) that stores recovery-process identifiers for several different activity values. Each recovery-process identifier specifies a particular recovery process, which, as mentioned above, includes a set of steps that needs to be performed to reset a set of account credentials. For instance, in some embodiments, each recovery-process identifier identifies a file that contains the definition (e.g., in terms of the reset steps) of the recovery process associated with the identifier.

Figure 2:
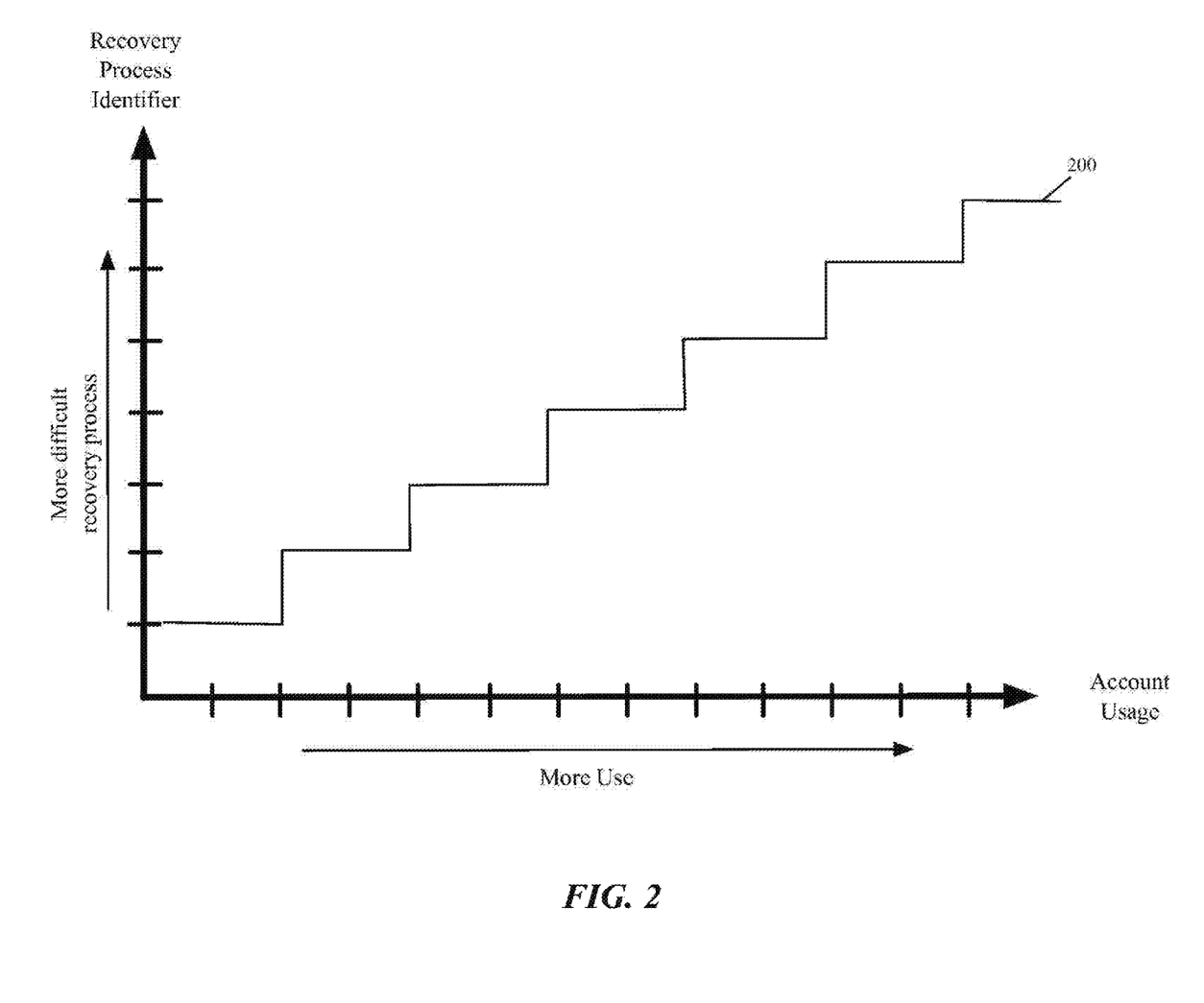
FIG. 2 illustrates an example of a recovery graph of some embodiments.

Instead of using a LUT, other embodiments use a recovery graph that maps each activity value to a recovery-process identifier. FIG. 2 illustrates an example of the recovery graph 200 of some embodiments. This graph correlates activity metric values to recovery-process identifiers. In this example, larger values for recovery-process identifiers indicate more onerous recovery processes than smaller values. Also, in this example, larger activity values signify more active accounts than smaller activity values. Hence, as shown in FIG. 2, the recovery graph 200 assigns tougher recovery processes for AAR requests that are associated with recently used accounts (i.e., accounts with higher activity scores). For embodiments that use LUT or other approaches to select recovery process based on account activity, FIG. 2 conceptually illustrates one manner for correlating recovery process complexity with the account activity.

After selecting (at 120) an AAR process, the server set provides the selected recovery process to the requesting party. The steps of the recovery process need to be performed satisfactorily (e.g., by the requesting party, or from a party that receives these steps from the requesting party) before the server set allows the requested credential set to be reset.

Figure 3:
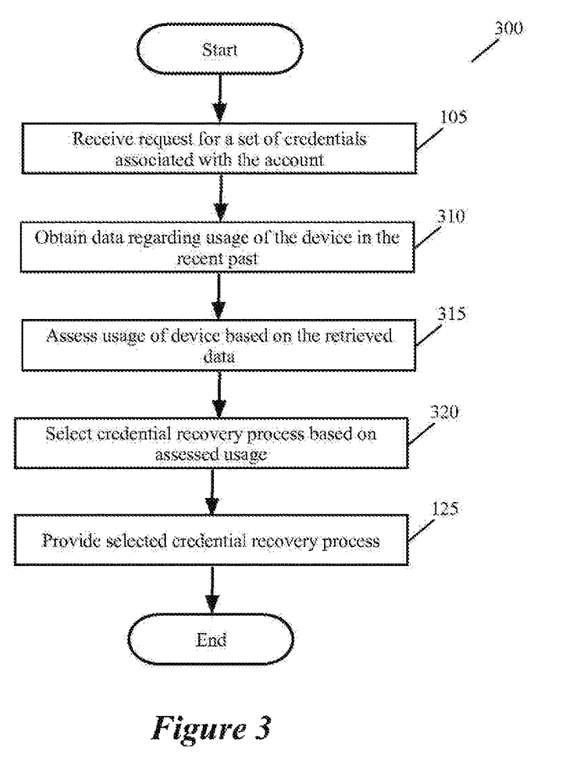
FIG. 3 conceptually illustrates another AAR process of some embodiments.

FIG. 3 illustrates another example of a recovery method 300 of some embodiments. This method selects a recovery process from a group of different recovery processes based on reported recent usage of a device associated with the account. Like the method of FIG. 1, the method 300 of FIG. 3 is implemented by a set of one or more servers that manages several accounts, each of which can provide one or more services, such as data-storage services, data-access services, email services, data synchronization services, etc.

Also as in FIG. 1, the server set in FIG. 3 initially receives (at 105) a request to reset a set of credentials (e.g., username and/or password) for accessing an account from a requesting party, which can be a person, entity, device, a client application, etc. After receiving the request to reset the set of credentials, the server set obtains (at 310) data regarding recent usage (e.g., usage in the past day, few days, week, etc.) of a device associated with the account. In some embodiments, the server set obtains this information by accessing one or more data storages of the server set, and/or one or more data storages accessible by the server set.

In some embodiments, the device that is associated with the account has an account recovery parameter (called ARP below) that allows a user to reset a set of credentials for an account. The use of the ARP is further described in concurrently filed U.S. patent application Ser. No. 14/872,027 entitled "Account Access Recovery System, Method and Apparatus" and U.S. patent application Ser. No. 14/872,034 entitled "Account Access Recovery System, Method and Apparatus". As described in this application, some embodiments allow the device to use the ARP to reset an account password if the user first provides a device access control parameter (e.g., the device unlock passcode, unlock gesture, etc.) that is needed to unlock the device. The provided access control parameter has to be authenticated (e.g., by the device) before allowing the device to use the ARP to reset the account password.

Some embodiments assess the usage of an account-associated device to quantify the veracity of an AAR request that aims to reset the account credential set without using the device. Such a request makes sense if the device is not readily available (e.g., is lost, misplaced, or placed at a distant location), because if the device is available, the account credential set could be more easily changed by using the device. When the requesting party claims that the device is not readily available, then the device should not be currently in use or should be less likely to have been recently used. Some embodiments assess usage of an account-associated device even when the device does not have ARP.

Figure 4:
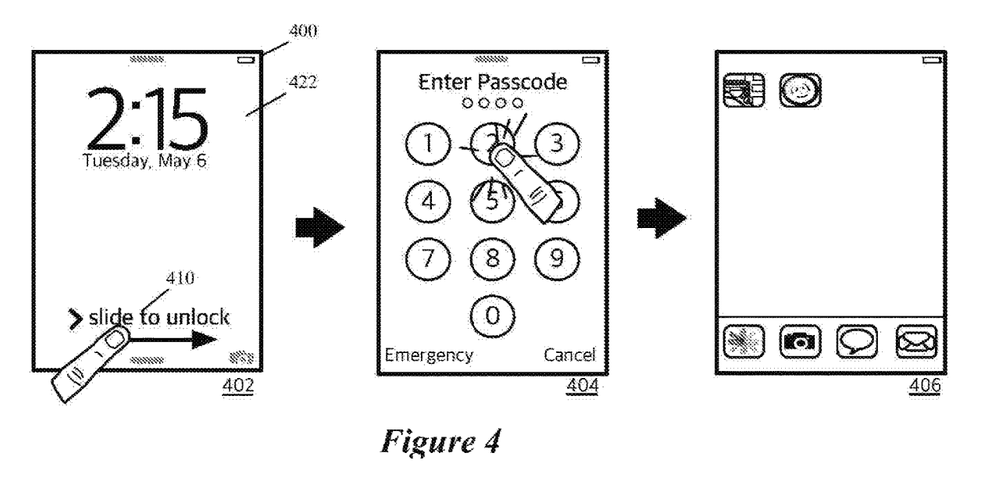
FIG. 4 illustrates an example of unlocking a device.

In some embodiments, device usage is assessed in terms of lock and/or unlock event data of the device that is reported for a recent time period to the particular server set that implements the recovery method, or to another server set accessible by or having a storage that is accessible by the particular server set. FIG. 4 illustrates one example for unlocking a device in terms of three operational stages 402-406 of the device. This device is associated with an account that has the credential set that is being reset by the process 300. In this example, the device is a smartphone with a touch-sensitive screen 400. The screen 400 is locked by the user or after a period of inactively, so that the device cannot be accessed or accidentally used.

In this example, the operational stages 402-406 show the device being unlocked by a user (1) dragging an unlock affordance 410 on a device-lock page 422 from left to right, and (2) providing a passcode that is needed for unlocking the device. One of ordinary skill will realize that in other embodiments the device's screen is unlocked through other device access control mechanisms (e.g., through touch or non-touch gestures, etc.).

On a periodic basis (e.g., every 24 hours), the device in some embodiments reports to a server (e.g., to the set of one or more servers that performs the process 300 or that is in communication with the server set that performs the process 300) whether it has been unlocked during the previous reporting period. If the device has been unlocked during a period, a flag is set by the server. When the flag is set, the process 300 determines (at 310) that the device has been recently used, whereas when the flag is not set, the process determines (at 310) that the device has not been recently used. If the device is misplaced, is at a different location, or is with an undesirable third party for more than the particular period, the device presumably cannot be unlocked because there is no one to enter the passcode or the third party cannot enter the correct passcode.

In addition to, or instead of, using the lock and/or unlock event data of the device, some embodiments assess device usage by analyzing other reported operations on the device and/or network-based operations performed by the device. Also, in some embodiments, the server set combines both the device-usage and account-usage assessment approaches by examining a device's use of services that are associated with the account for which the AAR request has been received.

To assess the activity of the device, the server set of some embodiments computes an activity value based on the device's reported usage (e.g., the device's locked/unlocked event data in the last day, few days, week, etc.). In some embodiments, the server set computes the activity value to expresses the device's recent usage of services associated with the account (as opposed to more generally assessing the usage of the device). In some embodiments, the server set computes the activity metric by just relying on the device's uses, or biasing towards the device's uses of, services that require active user participation, as opposed to the device's passive use of these services. For instance, in some embodiments, the device's use of some account services (such as sending emails, purchasing items, etc.) requires a user to actively interact with the account services, while the device's use of other account services (such as receiving emails, downloading data for background services on a device, etc.) does not require a user to actively interact with the account services. Accordingly, some embodiments compute the activity metric to factor only, or to be biased towards, the device's usage of account services that require active participation of a user.

The server set then uses (at 320) the assessed activity (e.g., the activity metric) of the device to select a recovery process from a group of different recovery processes. Recovery processes can differ in a variety of ways, as described above by reference to FIG. 1. Based on assessed account usage activity, the process 300 in some embodiments (at 125) might reject an account recovery request outright, or might provide the most onerous recovery process, which in some case would require the user to show up to a location (e.g., a store) and provide identification documents to verify the identity.

For example, when the device lock and/or unlock event data shows that the device is continuously being used and the device is a device that has an ARP that allows it to assist in the account access recovery, the process 300 in some embodiments rejects (at 125) the account recovery request (received at 105) and directs the user to either use the device's ARP for this request and/or go to a store obtain assistance with this matter. When the user has multiple devices associated with an account and several of these devices have an ARP, the process 300 in some embodiments rejects the account recovery request and direct the user to one of the devices with the ARP so long as one of these devices appears to be in active use.

Figure 5:
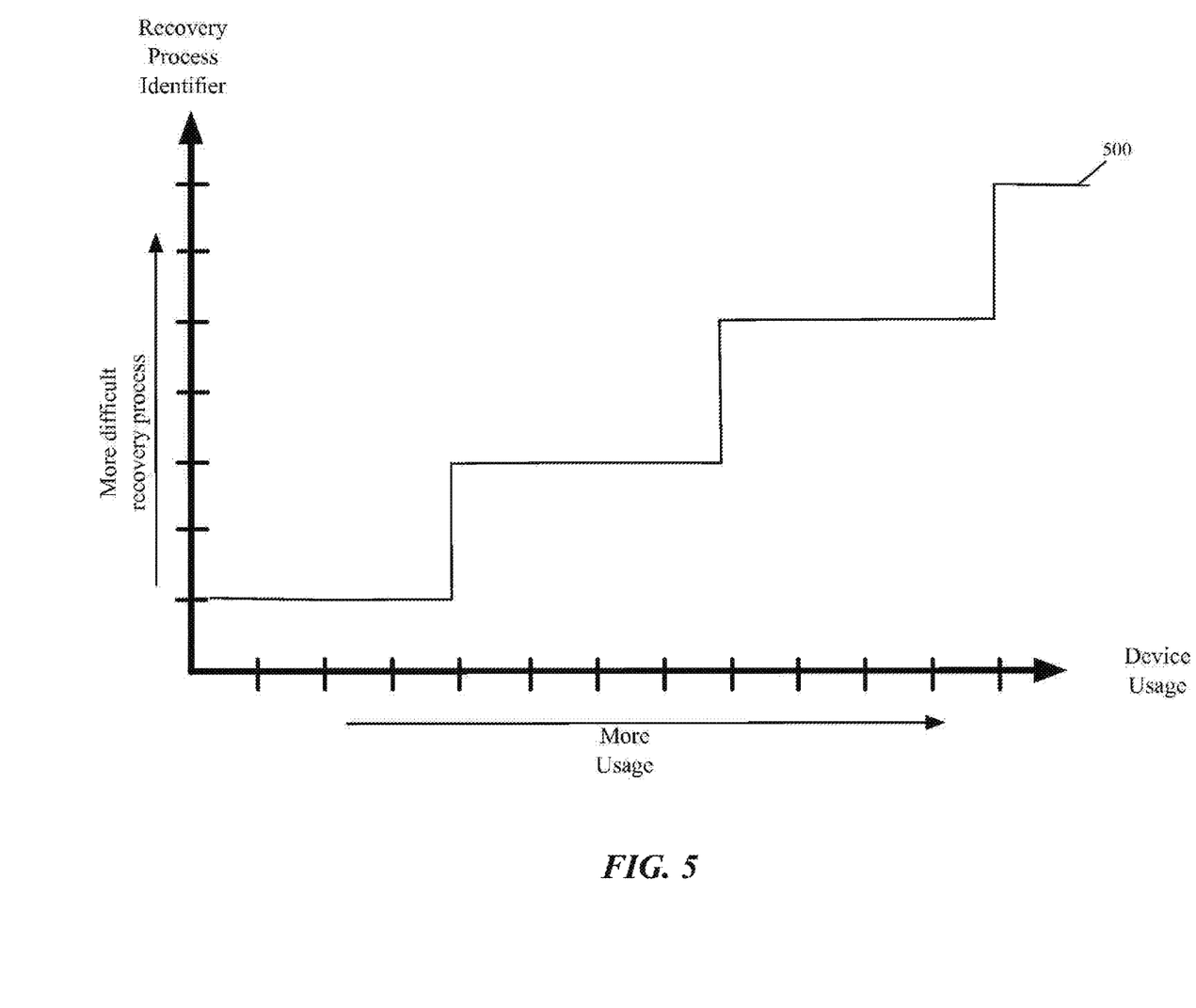
FIG. 5 illustrates another example of a recovery graph of some embodiments.

The server set can select a recovery process based on the assessed device activity by using any of the above-described selection mechanisms (LUT, recovery graph, etc.) that select a recovery process based on the assessed activity of an account. For example, as shown in FIG. 5, the server set in some embodiments uses a recovery graph 500 that maps a device's activity value to a recovery-process identifier that identifies a particular recovery process, which provides the set of steps that needs to be performed to reset a set of credentials for the account associated with the device. In the example illustrated in FIG. 5, the recovery graph 500 assigns tougher recovery processes for AAR requests that are associated with more recently devices (i.e., devices with higher activity scores).

After selecting (at 320) a recovery process, the server set provides the selected recovery process to the requesting party. The steps of the recovery process need to be performed satisfactorily (e.g., by the requesting party, or from a party that receives these steps from the requesting party) before the server set allows the requested credential set to be reset.

The processes 100 and 300 assess account and/or device usage history in order to quantify the extent to which an account and/or a device have been recently used. To do this, these processes rely on usage data that is gathered for the account and/or the device. In some embodiments, the usage data is stored in a format that protects a user's privacy. For instance, in some embodiments, this data is encrypted or protected through other means, and this protected data can only be accessed for any reason other than to allow the user to recovery access to his account. Conjunctively, or alternatively, the stored usage data in some embodiments is analysis data that is derived from usage data that is gathered for the account and/or device. One example of such analysis data is the unlock flag that is set in some embodiments each time that the device has been unlocked at least once during a time period. In some embodiments, this flag does not provide an indication of the number of times that the device has been unlocked but simply provides an indication that the device has been used at least once in the time period.

Even though the methods of FIGS. 1 and 3 are described by reference to numerous details, one of ordinary skill will realize that the recovery methods of some embodiments can be implemented without many of these details. For instance, in some embodiments, one or more operations of the access recovery methods of these figures are performed by a person at a call center after a party calls the call center to reset their account credential set. Also, in some embodiments, the access recovery method does not select from a large group of different recovery processes. For instance, in some embodiments, the method can just select between two different recovery processes, a more onerous process for accounts/devices that seem to be active, and a less onerous process for accounts/devices that seem to be inactive.

In some embodiments, the recovery method includes a time delay in one or more AAR processes. For instance, after examining reported uses of the account and/or an account-associated device, the method may determine that the account and/or device have not been used recently. However, to ensure that this is not just an aberration, the method does not provide the requested credentials for a time period, during which it iteratively monitors the usage of the account or device to ensure that the account or device does not become active after a period of inactivity. When the account or device becomes active during the time period, the method rejects the AAR request or provides a much more onerous recovery process to provide the requested credentials.

Figure 6:
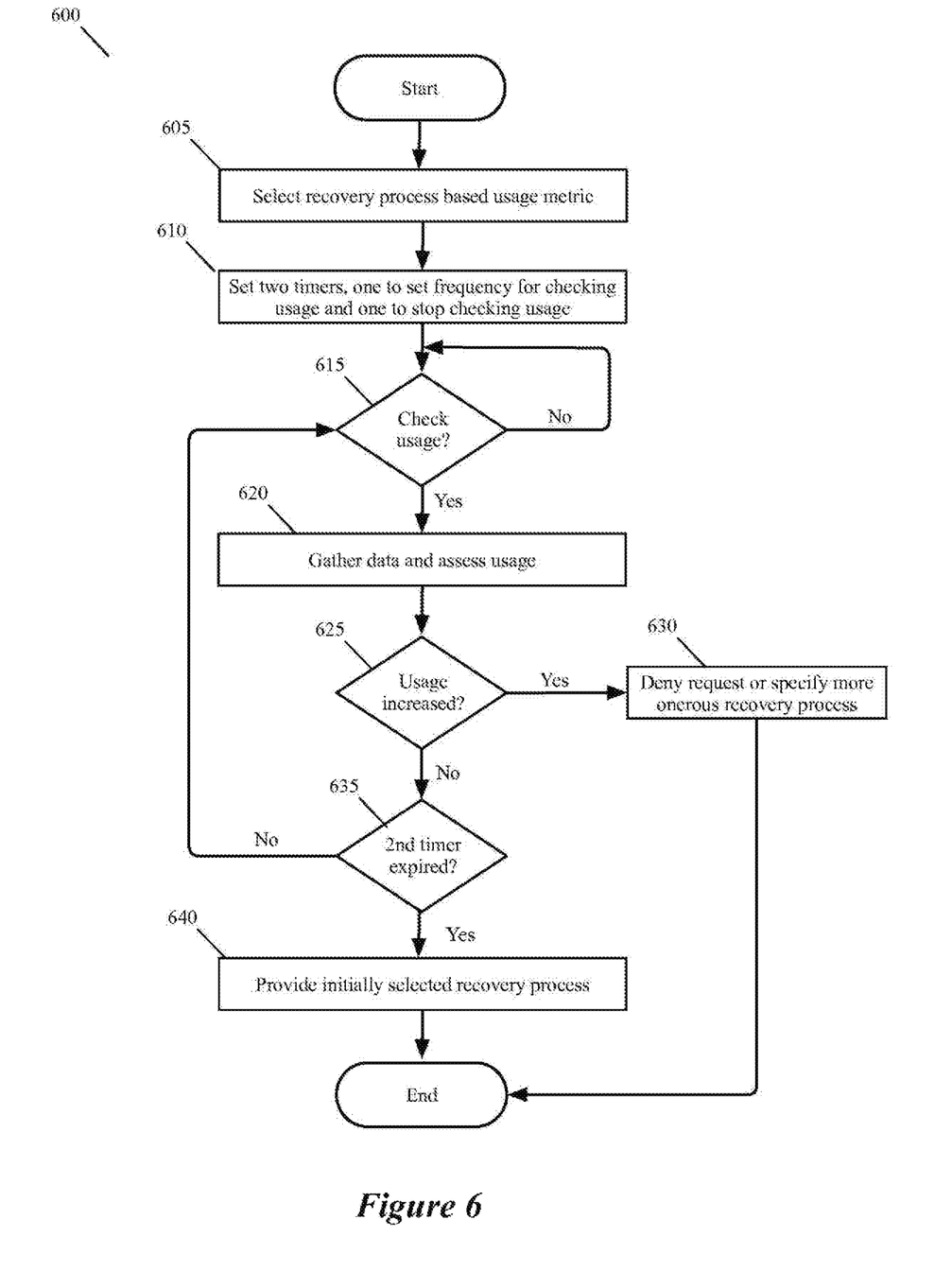
FIG. 6 illustrates an introduction of a time delay in a recovery process of some embodiments.

FIG. 6 illustrates a method 600 that is performed in some embodiments to introduce a time delay in a recovery process to ensure that the account or device is in fact not being actively used. In some embodiments, a server set performs this method after selecting an initial recovery process based on an assessed usage metric that quantifies the usage of an account and/or device. Accordingly, this method starts once the server set has selected (at 605) an initial recovery process based on a relatively low usage of the account and/or the device. In some embodiments, the method selects the initial recovery process by using either of the methods that are illustrated in FIGS. 1 and 3.

Next, at 610, the server set defines first and second timers. The first timer sets the frequency for iteratively checking the account/device usage during small periods (e.g., every 12 or 24 hours), while the second timer sets the overall period during which the account/device usage should be monitored. At 615, the method then determines whether the first timer has expired. The method remains at 615 until the first timer expires.

Once this timer expires, it is time for the server set to assess the usage of the account/device. Hence, once the first timer expires, the server set gathers data regarding the account/device usages in the previous period (defined by the duration of the first timer) and assesses this usage data. The server set then determines (at 625) whether the usage data has increased sufficiently from when the server set performed either the operations of FIG. 1 or 3 to select (at 605) the initial recovery process. If so, the server set (at 630) either denies the AAR request or specifies a more onerous AAR process than the one specified at 605. This is because the increased usage of the account and/or device requires the AAR request to be treated with a heightened level of scrutiny. After 630, the method end.

On the other hand, when the server set determines (at 625) that the assessed usage of the account and/or device has not increased sufficiently, the server set determines (at 635) whether the second timer has expired. As mentioned above, the second timer defines the period during which the account and/or device usage should be monitored to determine if the account and/or device become more active after a period of assessed low activity. When the second timer has not expired, the method returns to 615. When the server set determines (at 635) that the second timer has expired, the server set provides (at 640) the recovery process that it initially selected at 605, as the usages of the account and/or device did not significantly increase after an assessed low-activity period. After 640, the method ends.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
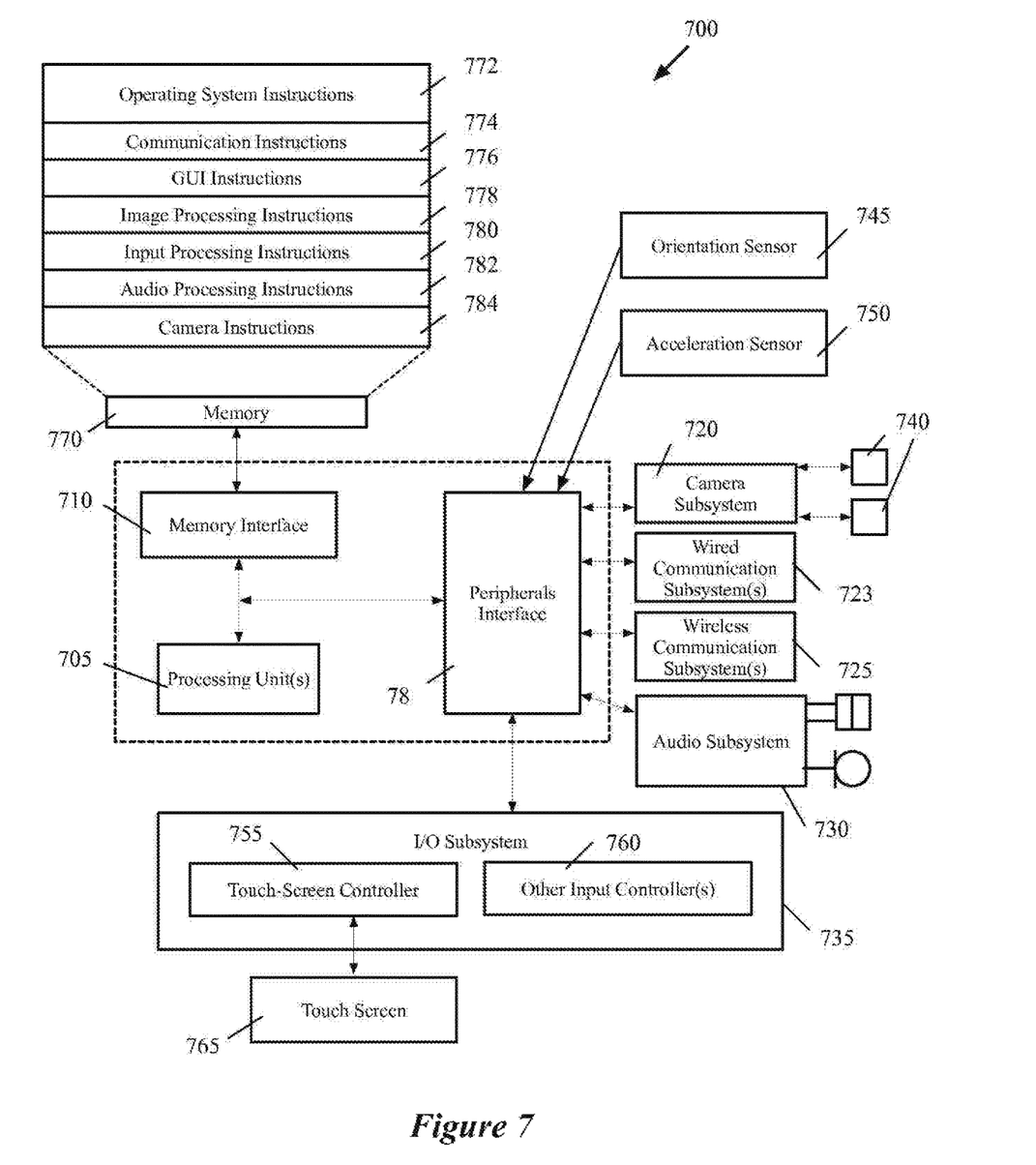
FIG. 7 is an example of an architecture of a mobile computing device.

The applications of some embodiments operate on mobile devices, such as smart phones (e.g., iPhones®) and tablets (e.g., iPads®). FIG. 7 is an example of an architecture 700 of such a mobile computing device. Examples of mobile computing devices include smartphones, tablets, laptops, etc. As shown, the mobile computing device 700 includes one or more processing units 705, a memory interface 710 and a peripherals interface 715.

The peripherals interface 715 is coupled to various sensors and subsystems, including a camera subsystem 720, a wireless communication subsystem(s) 725, an audio subsystem 730, an I/O subsystem 735, etc. The peripherals interface 715 enables communication between the processing units 705 and various peripherals. For example, an orientation sensor 745 (e.g., a gyroscope) and an acceleration sensor 750 (e.g., an accelerometer) is coupled to the peripherals interface 715 to facilitate orientation and acceleration functions.

The camera subsystem 720 is coupled to one or more optical sensors 740 (e.g., a charged coupled device (CCD) optical sensor, a complementary metal-oxide-semiconductor (CMOS) optical sensor, etc.). The camera subsystem 720 coupled with the optical sensors 740 facilitates camera functions, such as image and/or video data capturing. The wireless communication subsystem 725 serves to facilitate communication functions. In some embodiments, the wireless communication subsystem 725 includes radio frequency receivers and transmitters, and optical receivers and transmitters (not shown in FIG. 7). These receivers and transmitters of some embodiments are implemented to operate over one or more communication networks such as a GSM network, a Wi-Fi network, a Bluetooth network, etc. The audio subsystem 730 is coupled to a speaker to output audio (e.g., to output voice navigation instructions). Additionally, the audio subsystem 730 is coupled to a microphone to facilitate voice-enabled functions, such as voice recognition (e.g., for searching), digital recording, etc.

The I/O subsystem 735 involves the transfer between input/output peripheral devices, such as a display, a touch screen, etc., and the data bus of the processing units 705 through the peripherals interface 715. The I/O subsystem 735 includes a touch-screen controller 755 and other input controllers 760 to facilitate the transfer between input/output peripheral devices and the data bus of the processing units 705. As shown, the touch-screen controller 755 is coupled to a touch screen 765. The touch-screen controller 755 detects contact and movement on the touch screen 765 using any of multiple touch sensitivity technologies. The other input controllers 760 are coupled to other input/control devices, such as one or more buttons. Some embodiments include a near-touch sensitive screen and a corresponding controller that can detect near-touch interactions instead of or in addition to touch interactions.

The memory interface 710 is coupled to memory 770. In some embodiments, the memory 770 includes volatile memory (e.g., high-speed random access memory), non-volatile memory (e.g., flash memory), a combination of volatile and non-volatile memory, and/or any other type of memory. As illustrated in FIG. 7, the memory 770 stores an operating system (OS) 772. The OS 772 includes instructions for handling basic system services and for performing hardware dependent tasks.

The memory 770 also includes communication instructions 774 to facilitate communicating with one or more additional devices; graphical user interface instructions 776 to facilitate graphic user interface processing; image processing instructions 778 to facilitate image-related processing and functions; input processing instructions 780 to facilitate input-related (e.g., touch input) processes and functions; audio processing instructions 782 to facilitate audio-related processes and functions; and camera instructions 784 to facilitate camera-related processes and functions. The instructions described above are merely exemplary and the memory 770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 7 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 7 may be split into two or more integrated circuits.

Figure 8:
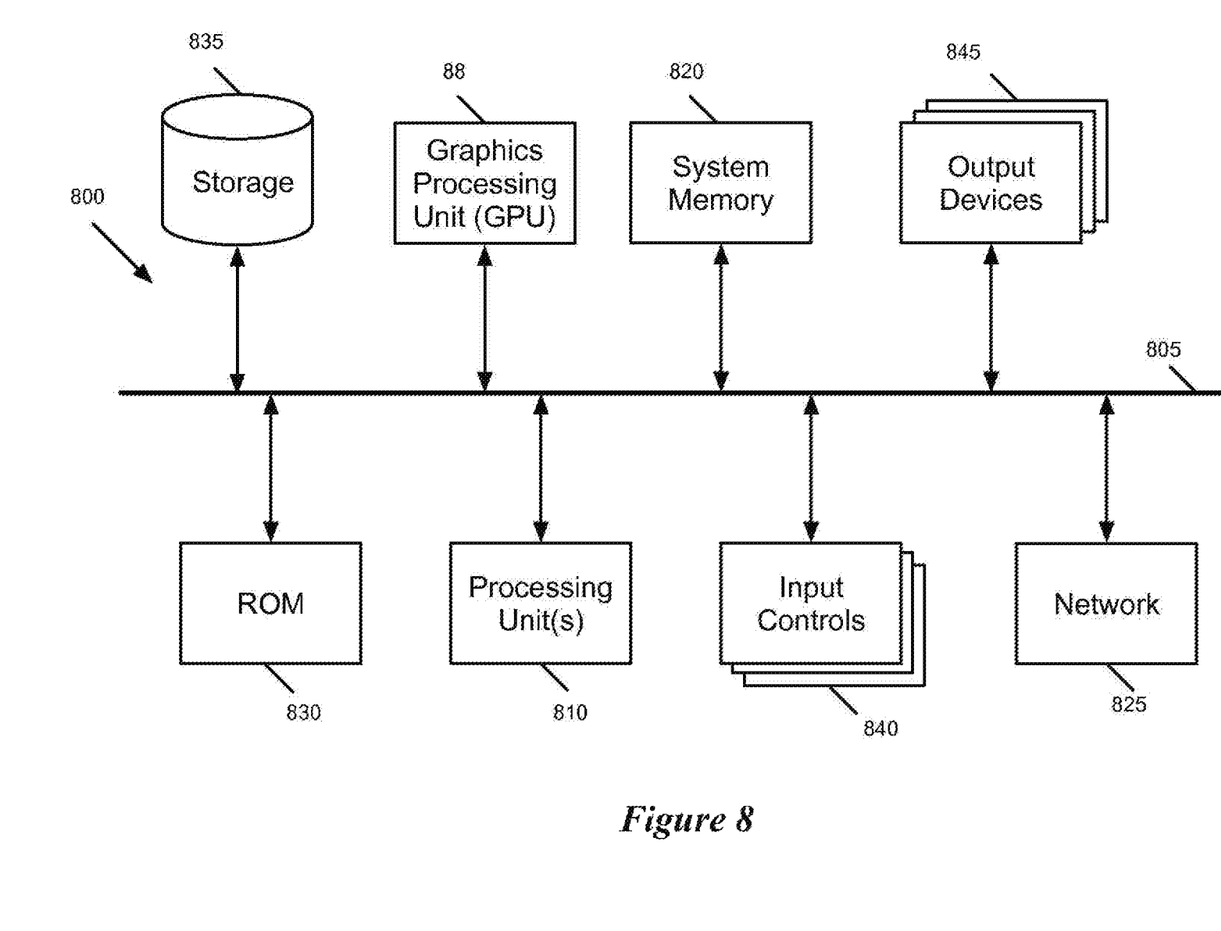
FIG. 8 conceptually illustrates another example of an electronic system with which some embodiments of the invention are implemented.

FIG. 8 conceptually illustrates another example of an electronic system 800 with which some embodiments of the invention are implemented. The electronic system 800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 800 includes a bus 805, processing unit(s) 810, a graphics processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the GPU 815, the system memory 820, and the permanent storage device 835.

From these various memory units, the processing unit(s) 810 retrieves instructions to execute and data to process in order to execute the processes of the invention. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive, integrated flash memory) as the permanent storage device 835.

Other embodiments use a removable storage device (such as a floppy disk, flash memory device, etc., and its corresponding drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor needs at runtime. In some embodiments, the invention's processes are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet), or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, the account access recovery processes of some embodiments were described above by reference to account credential-reset operations (e.g., password reset operations). However, one of ordinary skill will realize that the account recovery processes of some embodiments can be used to gain access to an account through other mechanisms. For instance, in some embodiments, an account is locked after multiple failed login attempts. For such circumstances, some embodiments allow the recovery processes to be used to unlock a locked account. Other embodiments may allow the credential set to be recovered after a requesting party performs the recovery process. Yet other embodiments allow the requesting party to gain access to data and/or services that are accessible through the account associated with the credential set, after the requesting party performs the recovery process.

The discussion above also refers to recovering access to an account in order to obtain services from one or more servers. In other embodiments, the account access recovery allows a user to gain access to services provided by the device itself. Thus, one of ordinary skill in the art would understand that the invention is not to be limited by the foregoing illustrative details, but rather is to be defined by the appended claims.

What is claimed is:

1. A method comprising:
   receiving a request to recover access to an account;
   assessing recent usage of a device that is associated with the account, the recent usage comprising unlock event data for the device;
   based on the assessment, selecting a recovery process from a group of different recovery processes for regaining access to the account; and
   providing the selected recovery process to a party that is requesting to recover access to the account.

2. The method of claim 1, wherein assessing recent usage comprises
   computing an activity metric value to quantify the recent usage of the device and selecting the recovery process comprises correlating the activity metric value to the selected recovery process.

3. The method of claim 1, wherein assessing recent usage comprises:
   obtaining the unlock event data for the device, wherein an access control parameter must be provided on the device in order to unlock the device; and
   assessing the unlock event data to determine whether the device has been unlocked a requisite number of times during a time period.

4. The method of claim 3, wherein the obtained unlock event data comprises a flag that indicates weather the device has been unlocked with a time period before receiving the request to recover access to the account.

5. The method of claim 4, wherein the device provides unlock event data periodically about whether the device has been unlocked a requisite number of times during a previous monitoring time period, and the device provided data is stored in a storage from which the unlock event data is subsequently obtained.

6. The method of claim 4,
wherein the device stores an account recovery parameter that allows the device to request to recover access to the account through the access control parameter of the device,
wherein the unlock event data is assessed in order to ensure that the device is not readily available to use in the request to recover access to the account.

7. The method of claim 1,
wherein each recovery process requires a set of recovery operations to be performed,
wherein two different recovery processes have at least one recovery operation not in common.

8. The method of claim 7, wherein recovery operations of different recovery processes includes one or more of:
answering a set of one or more questions regarding a user of the device, wherein a set of answers to the questions was previously collected;
retrieving a secondary authentication parameter from an email account;
retrieving a secondary authentication parameter from a text message sent to a trusted phone number associated with the user;
providing a security code from a credit card; or
showing a personal identification document to identify the user.

9. The method of claim 7,
wherein a first set of recovery operations of a first recovery process comprises answering a first set of questions regarding a user of the device,
wherein a second set of recovery operations of a second more onerous recovery process comprises answering a second set of questions regarding the user of the device,
wherein the second set of questions are more difficult questions than the first set of questions as the second set of questions have less commonly known answers.

10. The method of claim 1, wherein the received request comprises at least one of: (1) a request to reset a credential for accessing the account or (2) a request to unlock an account that has been locked and cannot be used.

11. The method of claim 1, further comprising:
assessing recent usage of the account, separately from the assessment of the recent usage of the device associated with the account; and
selecting the recovery process based on the assessment of the recent usage of the account and the assessment of the recent usage of the device associated with the account.

12. A non-transitory machine readable medium storing a program which when executed by at least one processor, causes the at least one processor to process account-access recovery requests, the program comprising sets of instructions for:
receiving a request to recover access to an account;
assessing recent usage of a device that is associated with the account based at least in part on whether the device was unlocked over a recent period of time;
based on the assessment, selecting a recovery process from a group of different recovery processes for regaining access to the account; and
providing the selected recovery process to a party that is requesting to recover access to the account.

13. The non-transitory machine readable medium of claim 12, wherein the set of instructions for selecting a recovery process comprises sets of instructions for:
selecting a first recovery process comprising a first recovery operation for a first assessed usage level of the device; and
selecting a second recovery process comprising a second recovery operation for a second assessed usage level of the device,
wherein the first assessed usage level is less than the second assessed usage level, wherein the second recovery operation is more onerous than the first recovery operation.

14. The non-transitory machine readable medium of claim 12,
wherein the device has an access control parameter for unlocking and using the device,
wherein the device stores an account recovery parameter that allows the device to request to recover access to the account,
wherein in response to an account access recovery request, the device (1) provides a prompt to receive the access control parameter, and (2) after receiving the access control parameter in response to the prompt, sends the account recovery parameter to request to recover access to the account,
wherein the set of instructions for providing the selected recovery process comprises a set of instructions for directing the use of the device's access control parameter to request to recover access to the account.

15. The non-transitory machine readable medium of claim 14,
wherein the set of instructions for assessing recent usage of the device comprises a set of instructions for assessing whether the device has been unlocked in a recent time period in order to ensure that the device is not readily available to use to request to recover access to the account.

16. The non-transitory machine readable medium of claim 12, wherein the set of instructions for assessing recent usage of the device comprises a set of instructions for assessing the device's use of the account.

17. The non-transitory machine readable medium of claim 16, wherein the set of instructions for assessing the device's use of the account comprises a set of instructions for assessing the device's active use of at least one service associated with the account.

18. The non-transitory machine readable medium of claim 17,
wherein the set of instructions for assessing the device's use of the account further
comprises a set of instructions for discounting the device's passive use of at least one service associated with the account,
wherein an active use requires participation by a user, while a passive use does not require participation by the user.

19. A device comprising:
a memory; and
at least one processor configured to:
receive a request to recover access to an account;
assess recent usage of the account over a predetermined time period prior to receipt of the request to recover access to the account;
assess recent usage of a device associated with the account, separately from the assessment of the recent usage of the account;

based on the assessment of the recent usage of the account and the assessment of the recent usage of the device associated with the account, select a recovery process from a group of different recovery processes for regaining access to the account; and provide the selected recovery process to a party that is requesting to recover access to the account.

20. The device of claim 19, wherein the at least one processor is further configured to assess the recent usage of the account by computing an activity metric value to quantify the recent usage of the account and select the recovery process by correlating the activity metric value to the selected recovery process.

21. The device of claim 20, wherein the at least one processor is further configured to correlate the activity metric value by using a recovery graph to correlate different recovery processes to different activity metric values.

22. The device of claim 20, wherein the at least one processor is further configured to correlate the activity metric value by using a look up table to correlate different recovery processes to different activity metric values.

* * * * *

UNITED STATES PATENT AND TRADEMARK OFFICE
CERTIFICATE OF CORRECTION

PATENT NO. : 10,735,396 B2
APPLICATION NO. : 16/167472
DATED : August 4, 2020
INVENTOR(S) : Ivan Krstic et al.

It is certified that error appears in the above-identified patent and that said Letters Patent is hereby corrected as shown below:

In the Claims

Column 14, Line 63 (Claim 4), Replace "weather" with --whether--.

Signed and Sealed this
Twenty-second Day of September, 2020

Andrei Iancu
*Director of the United States Patent and Trademark Office*